US010390630B2

(12) United States Patent
Bucher

(10) Patent No.: US 10,390,630 B2
(45) Date of Patent: Aug. 27, 2019

(54) INFANT THERMOREGULATION AND MONITORING SUPPORT SYSTEM

(71) Applicant: Sherri Bucher, Zionsville, IN (US)

(72) Inventor: Sherri Bucher, Zionsville, IN (US)

( * ) Notice: Subject to any disclaimer, the term of this patent is extended or adjusted under 35 U.S.C. 154(b) by 4 days.

(21) Appl. No.: 15/274,432

(22) Filed: Sep. 23, 2016

(65) Prior Publication Data

US 2017/0086600 A1 Mar. 30, 2017

Related U.S. Application Data

(60) Provisional application No. 62/232,618, filed on Sep. 25, 2015.

(51) Int. Cl.
*A47D 13/02* (2006.01)
*A47D 15/00* (2006.01)
*F25D 3/00* (2006.01)
*G05D 23/19* (2006.01)

(52) U.S. Cl.
CPC ......... *A47D 13/02* (2013.01); *A47D 13/025* (2013.01); *A47D 15/00* (2013.01); *F25D 3/00* (2013.01); *G05D 23/1917* (2013.01)

(58) Field of Classification Search
CPC ...... A47D 13/02; A47D 13/025; A47D 15/00; A47D 15/003; A47G 9/083; A47G 9/086; F25D 3/00; G05D 23/1917; A41B 13/06; A41B 13/065
USPC .......................................... 224/576, 158–161
See application file for complete search history.

(56) References Cited

U.S. PATENT DOCUMENTS

| 4,009,808 | A | * | 3/1977 | Sharp | A47D 13/025 224/160 |
| 5,178,309 | A | * | 1/1993 | Bicheler | A47D 13/025 224/153 |
| 7,484,645 | B2 | * | 2/2009 | Hoff | A47D 13/025 224/159 |
| 8,752,739 | B2 | * | 6/2014 | Bergkvist | A47D 13/025 224/158 |
| 2005/0045674 | A1 | * | 3/2005 | Rehbein | A47D 13/025 224/160 |
| 2008/0149674 | A1 | | 6/2008 | Hiniduma-Lokuge | |
| 2010/0010599 | A1 | | 1/2010 | Chen et al. | |

(Continued)

FOREIGN PATENT DOCUMENTS

GB 2496149 A 5/2013
WO 2015049670 A1 4/2015

OTHER PUBLICATIONS

International Search Report corresponding to International Application No. PCT/US2016/053394, dated Dec. 8, 2016 (8 pages).

*Primary Examiner* — Nathan J Newhouse
*Assistant Examiner* — Matthew T Theis
(74) *Attorney, Agent, or Firm* — Maginot, Moore & Beck, LLP

(57) ABSTRACT

An infant thermoregulation and monitoring support device is configured for thermoregulation support of infants, particularly premature and/or low birthweight infants. The device includes an enfolding mechanism, a carrying mechanism and a temperature stabilizing device. The carrying mechanism and the temperature stabilizing device are coupled to the enfolding mechanism. The temperature stabilizing device is configured to detect and/or modify the temperature of the enfolding mechanism.

18 Claims, 14 Drawing Sheets

(56) References Cited

U.S. PATENT DOCUMENTS

2011/0042429 A1* 2/2011 Frost ............... A47D 13/02
224/159
2015/0128350 A1* 5/2015 Paperno ............ A47G 9/083
5/655

* cited by examiner

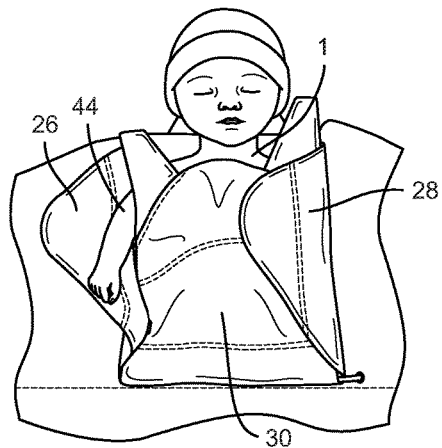
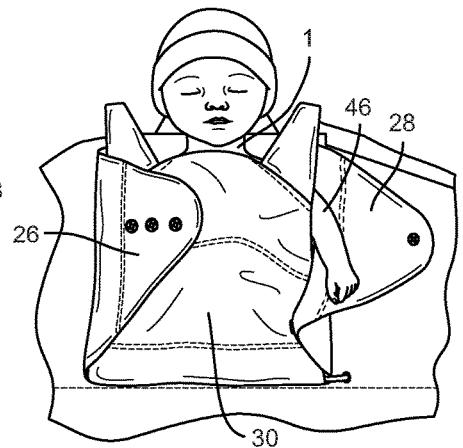
FIG. 13        FIG. 14
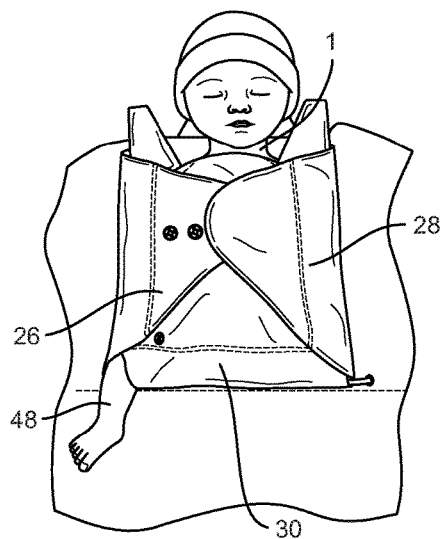
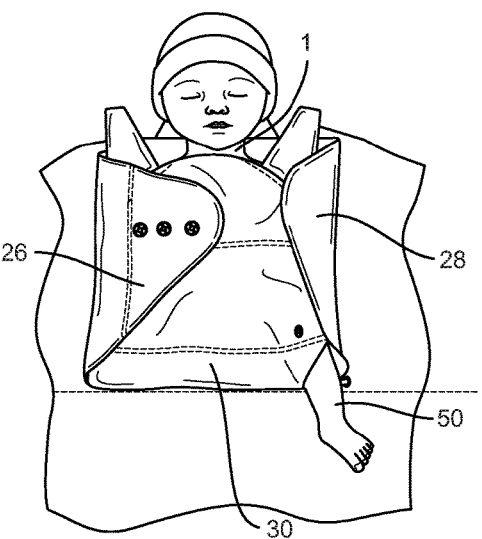
FIG. 15        FIG. 16

INFANT THERMOREGULATION AND MONITORING SUPPORT SYSTEM

This application claims priority to U.S. provisional patent application No. 62/232,618, filed on 25 Sep. 2015, the disclosure of which is incorporated herein by reference in its entirety.

FIELD OF DISCLOSURE

Background

The present disclosure relates generally to a device for thermoregulation and monitoring support of infants, particularly premature and/or low birthweight infants.

Each year, 15 million babies are born too soon or too small, and even in tropical settings, virtually all these premature and/or low birthweight babies are compromised in their ability to maintain a normal body temperature. As a result, scores of babies face grave danger from newborn hypothermia (low body temperature). For all newborns, but especially small babies, even a slight drop in body temperature below 36.5° C. can profoundly increase the risk for breathing problems, feeding difficulties, and infection, all of which are leading causes of global newborn death. Due to its estimated prevalence, hypothermia is thought to underlie virtually all of global newborn mortality. Unfortunately, despite the staggering magnitude of the problem, there is currently a paucity of safe, effective, feasible, culturally-acceptable, and affordable technical interventions to address neonatal hypothermia in resource-limited settings, where 99% of all global newborn deaths occur.

In high-income countries, current solutions to prevent and/or manage hypothermia include incubators, radiant warmers, gel mattresses, and warming blankets. These market products are often ill-suited for resource-limited settings; incubators and radiant warmers, in particular, are often prohibitively expensive to acquire, challenging to maintain, require infrastructure that is often scarce in low- and middle-income countries (e.g., reliable electricity), and need skilled personnel who are trained to safely operate, maintain, and repair the machinery.

Incubator care is not necessary for all small babies. At present, the preferred option to prevent hypothermia in resource-limited settings among medically stable, so-called "small, well babies" is Kangaroo Mother Care (KMC)/"skin-to-skin" care (STS). KMC/STS is an intervention in which the baby and caregiver lay on each other's bare skin; this "no tech solution" for newborn thermal regulation is well-suited and highly efficacious in many resource-limited settings. KMC/STS is targeted for scale-up by leading global health partners as an affordable, high-impact intervention. Despite the demonstrated benefits, relatively low-cost, and seeming simplicity of KMC/STS, in the 30 years since KMC was introduced to the world, wide-scale implementation and scalability have been hampered. Barriers to KMC/STS include the perceived complexity of training for health workers, implementation costs for health facilities (construction of KMC wards), and burden on caregivers (continuous KMC requires STS contact 20+ hours per day).

Accordingly, an easy-to-use, low cost device for supporting infant thermoregulation and monitoring is still needed both in resource-limited geographies as well as in developed geographies.

SUMMARY

In various embodiments, an infant thermoregulation and monitoring support device may include an enfolding mechanism, a carrying mechanism, and a temperature stabilizing device configured to maintain the temperature and monitor vital signs of the infant carried in the enfolding and/or carrying mechanisms.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

FIG. 13 is a view of an infant in an enfolding mechanism with a middle fold and a right fold in the closed position and a left fold in a partially open position allowing access to the infant's right arm;

FIG. 14 is a view of an infant in an enfolding mechanism with a middle fold and a left fold in the closed position and a right fold in a partially open position allowing access to the infant's left arm;

FIG. 15 is a view of an infant within an enfolding mechanism with a middle fold, a left fold and a right fold in the closed position while allowing access to the infant's right leg;

FIG. 16 is a view of an infant within an enfolding mechanism with a middle fold and a right fold in the closed position and a left fold in a partially open position allowing access to the infant's left leg;

Figure 1:
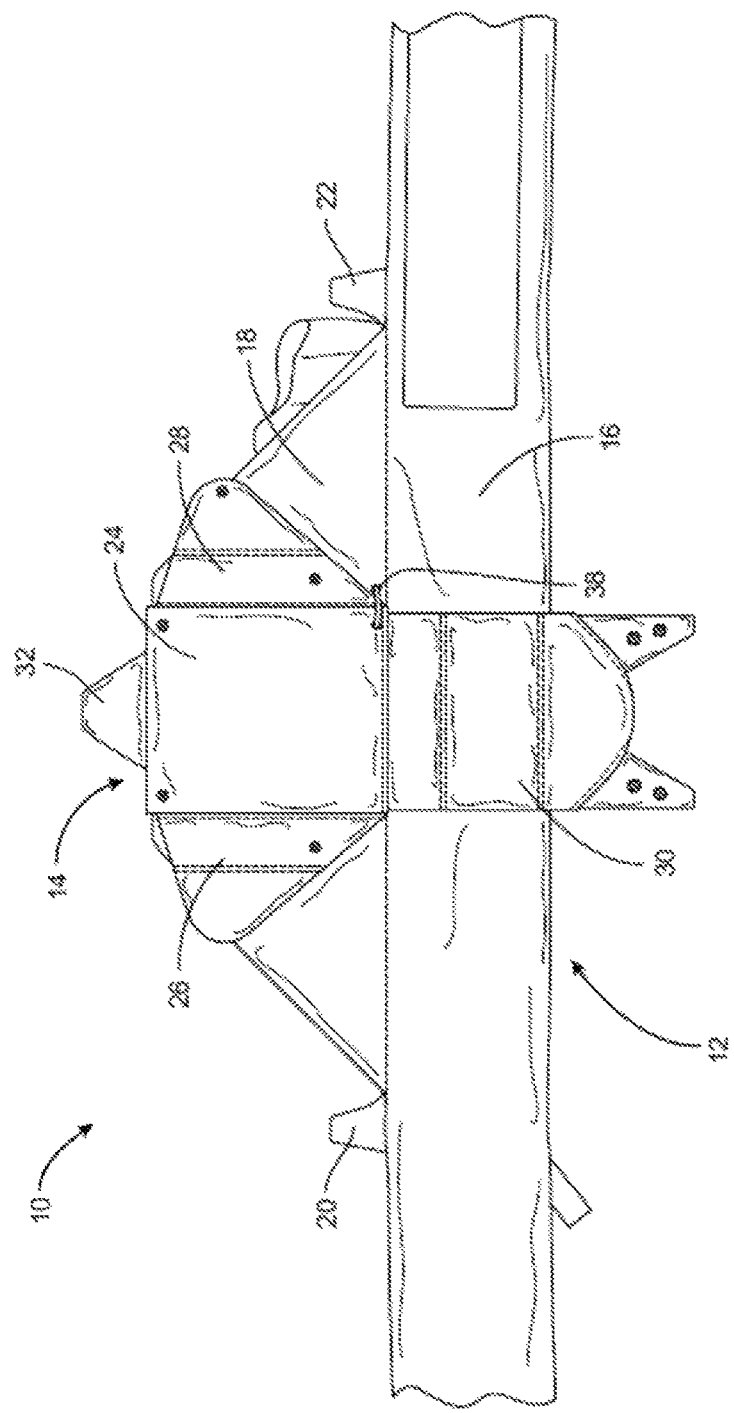
FIG. 1 is a view of an infant thermoregulation and monitoring support device with both an enfolding mechanism and a carrying mechanism in an open position.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the disclosure, and such exemplifications are not to be construed as limiting the scope of the disclosure in any manner.

DETAILED DESCRIPTION

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

Figure 6:
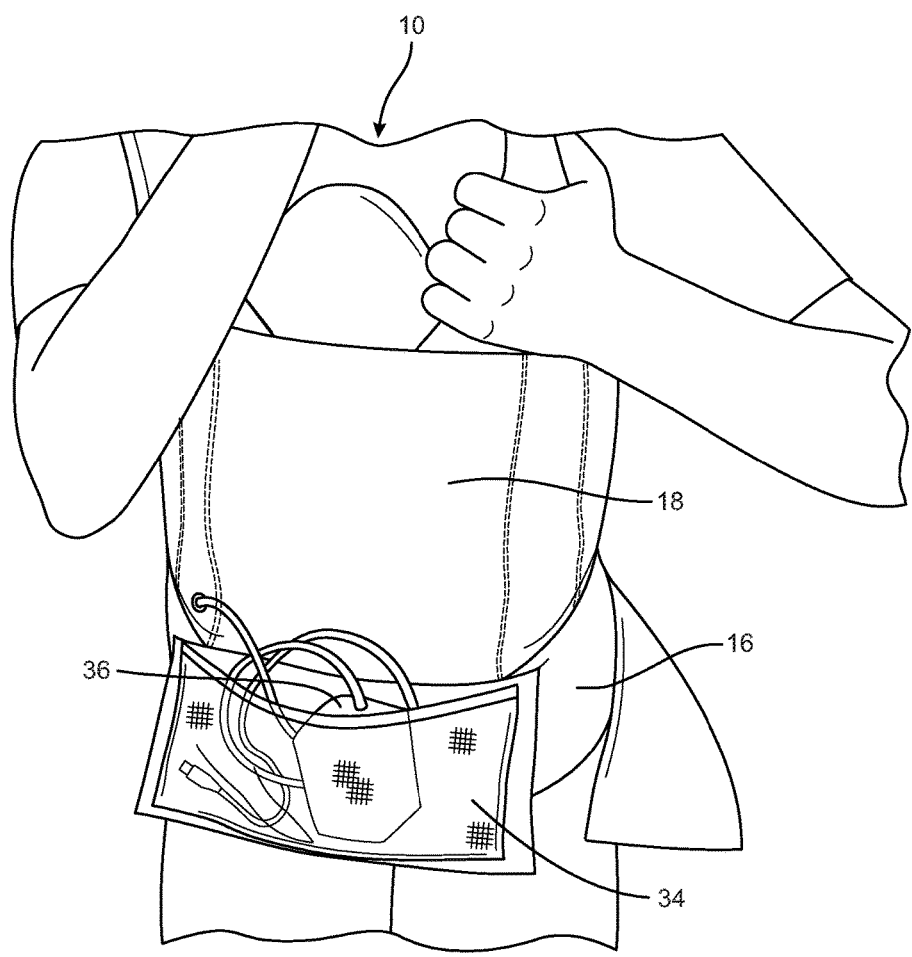
FIG. 6 is a view an infant thermoregulation and monitoring support device worn by a user.

Referring to FIG. 1, an infant thermoregulation and monitoring support device 10 generally includes a carrying mechanism 12, an enfolding mechanism 14 and a temperature stabilizing device 36 (FIG. 6).

Figure 3:
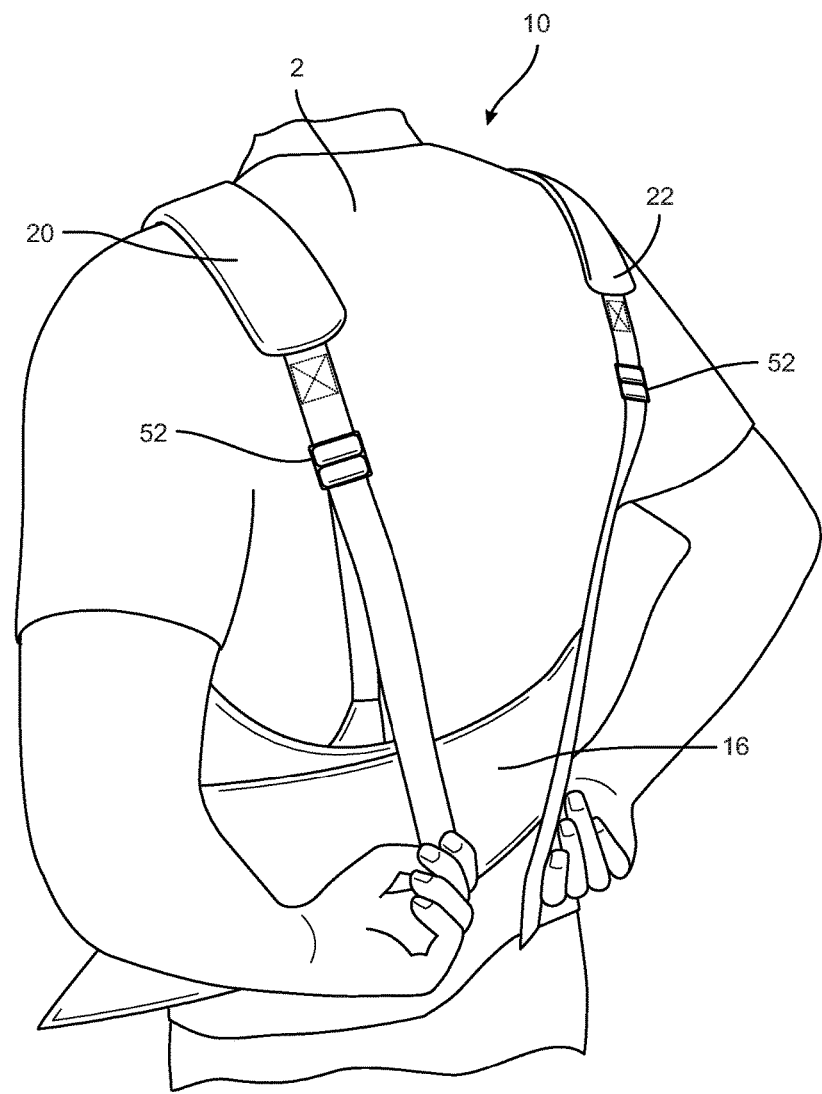
FIG. 3 is a view of a backside of a user wearing a carrying mechanism in a closed position with at least one strap being adjusted.

In more detail, and still referring to FIG. 1, carrying mechanism 12 generally includes a waistband 16, a support panel 18, and at least one strap 20, 22. Additionally, carrying mechanism 12 may be in an open position (FIG. 1) or a closed position (FIGS. 3 and 6). In general, carrying mechanism 12 is in a closed position when being worn by a user with straps 20, 22 over the user's shoulders, waistband 16 around the user's waist and support panel 18 across the user's chest and/or torso. Carrying mechanism 12 is in an open position generally when not being worn by a user and waistband 16 ends 16a, 16b are not joined. Common users for the device may include caregivers and/or parents. Carrying mechanism 12 may be sized to fit any range of adults or young adolescences.

Further, in various embodiments, carrying mechanism 12 may be formed of a comfortable, easily cleaned fabric. The fabric may also express anti-microbial properties, UV resistant characteristics, abrasion resistant characteristics and breathability properties. Additionally, the fabric may be easily cleaned with a dilute bleach solution. In one exemplary embodiment, carrying mechanism 12 may be formed using WeatherMax 65® fabric.

Figure 2:
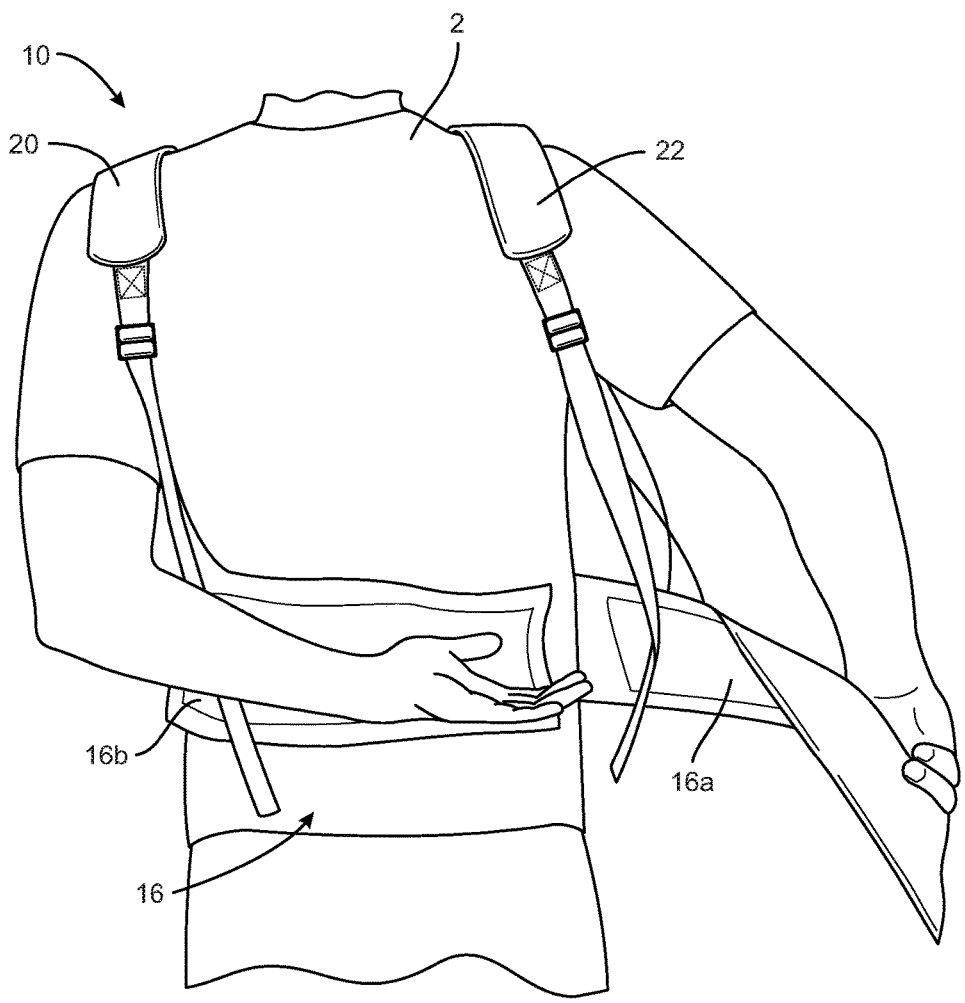
FIG. 2 is a view of a backside of a user while transforming a carrying mechanism from an open position to a closed position by the user.

With reference now to FIG. 2, waistband 16 may include a first end 16a and a second end 16b. First end 16a and second end 16b may be joined to transform waistband 16 from an open position to a closed position via at least one hook and loop closure, a snap, a button and/or other similar closure mechanisms. First end 16a and second end 16b may come together at varied distances to allow waistband 16 to fit various sized users around the waist. Thus, in one exemplary embodiment, first end 16a may include a long strip of a hook or loop side of a hook and loop closure, while second end 16b may include a long strip of the other side of a hook and loop closure. Further, first end 16a and second end 16b may substantially overlap when brought together to form waistband 16. Additionally, in various embodiments, first end 16a and second end 16b may come together at the front or side of user 2, while in other embodiments, ends 16a and 16b may come together at the rear of user 2. Also, in various embodiments, foam may be used within waistband 16 for additional support for device 10.

Referring to FIG. 3, straps 20, 22 may include at least one adjuster 52. Adjuster 52 allows for straps 20, 22 to be adjusted so that device 10 may fit a variety of users' torsos. In one exemplary embodiment, adjuster 52 may be a buckle. Further, adjuster 52 may be located along straps 20, 22 such that it is adjustable from the front or the back of user 2. Additionally, in various embodiments, straps 20, 22 may include foam inserts to help support device 10.

Figure 4:
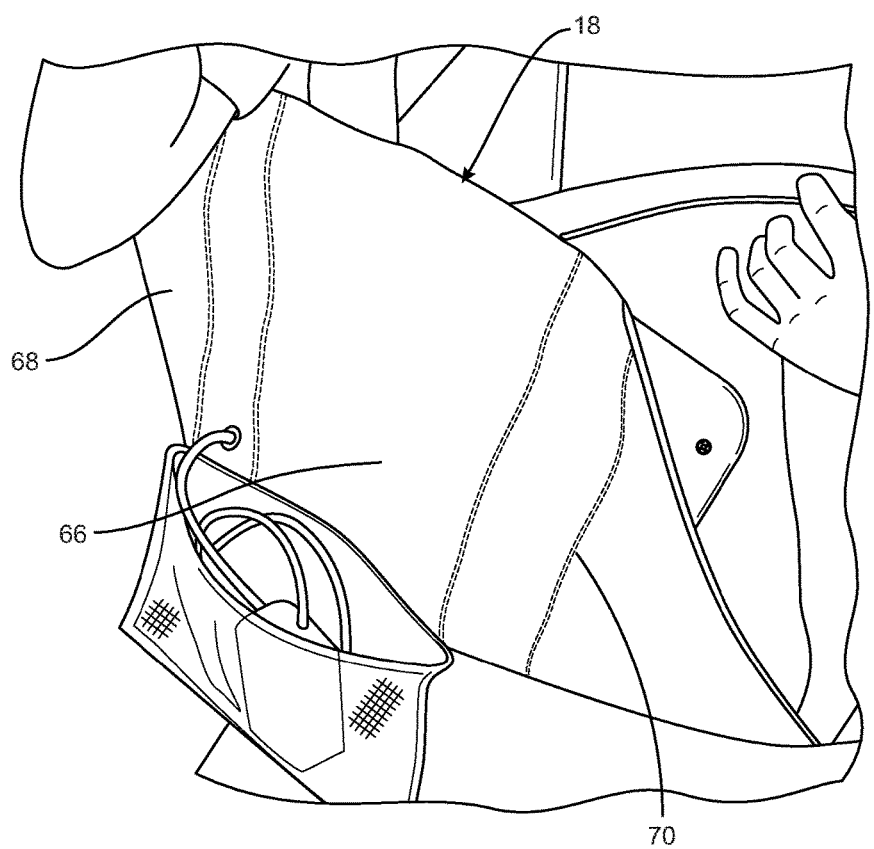
FIG. 4 is a view of a support panel of a carrying mechanism.

Referring now to FIG. 4, support panel 18 includes at least one section. In various embodiments, support panel 18 may include three sections. More particularly, the three sections may be a rectangular section 66 and two triangular sections 68, 70, one attached to each side of rectangular section 66. Additionally, in various embodiments, triangular sections 68, 70 may be attached by stitching or other similar methods to the sides of rectangular section 66. Support panel 18 may spread across most of a user's chest and/or torso.

Figure 5:
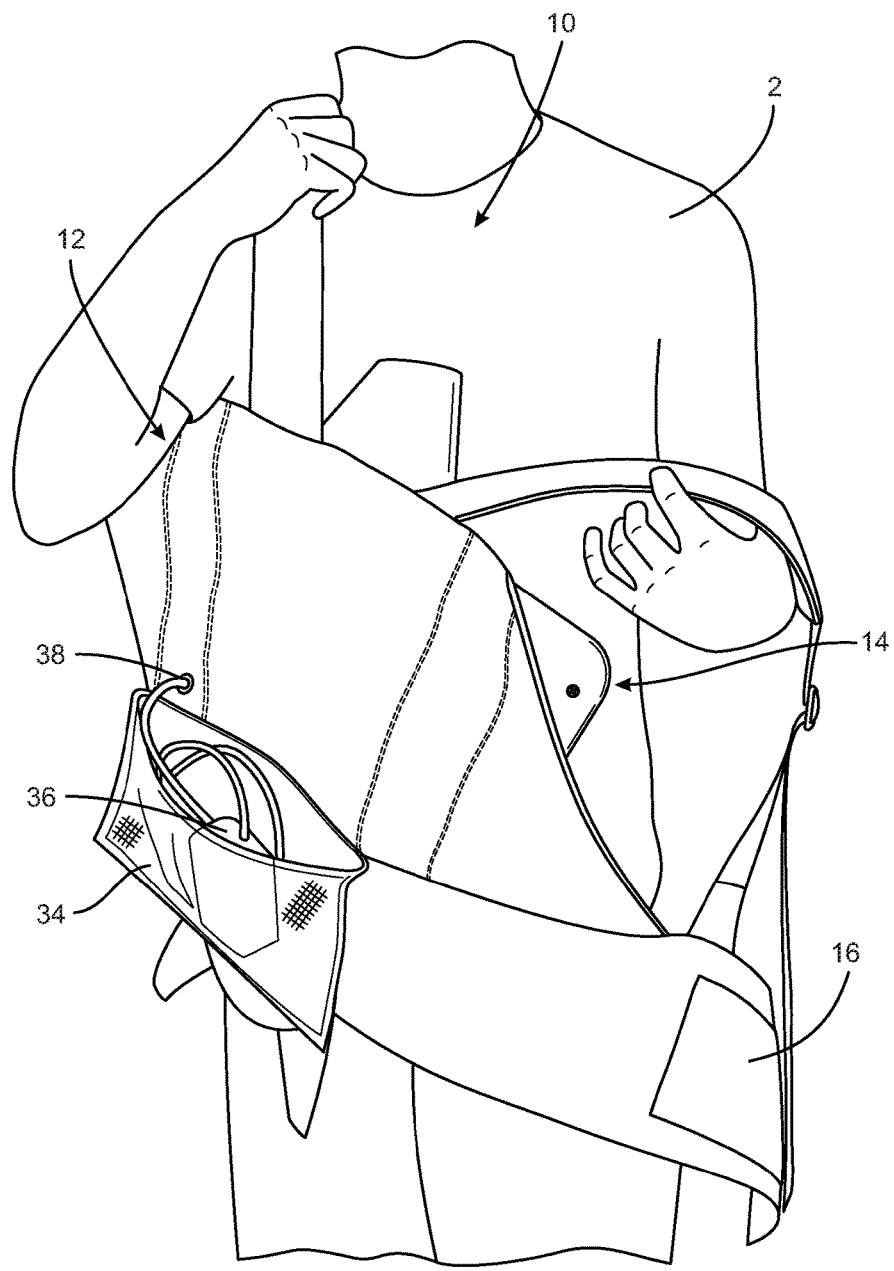
FIG. 5 is a is a view of the outward facing surface of an infant thermoregulation and monitoring support device with the device being placed on a user.

With reference now to FIGS. 5 and 6, carrying mechanism 12 may further include a pocket 34. Pocket 34 may be sewn onto the outward facing surface of carrying mechanism 12. Further, pocket 34 may be used to secure temperature stabilizing device 36 to device 10 or to hold other items needed while caring for a child or generally. Pocket 34 may be made of mesh, similar fabric to that used for carrying mechanism 12 or any other fabric capable of containing items. In various embodiments, waistband 16 may be wide enough such that temperature stabilizing device 36 may be secured solely to waistband 16. Also, carrying mechanism 12 may be configured to include a perforation or grommet 38. In various embodiments, enfolding mechanism 14 may be in electrical communication with a temperature stabilizing device 36 via perforation or grommet 38 (FIG. 1).

Still referring to FIG. 6, device 10 may be securely worn by user 2 such that infant 1 (FIG. 7) may be placed between device 10 and the chest of user 2. In various embodiments, when device 10 is worn by user 2, enfolding mechanism 14 may be in the open position and carrying mechanism 12 may be in the closed position.

Figure 7:
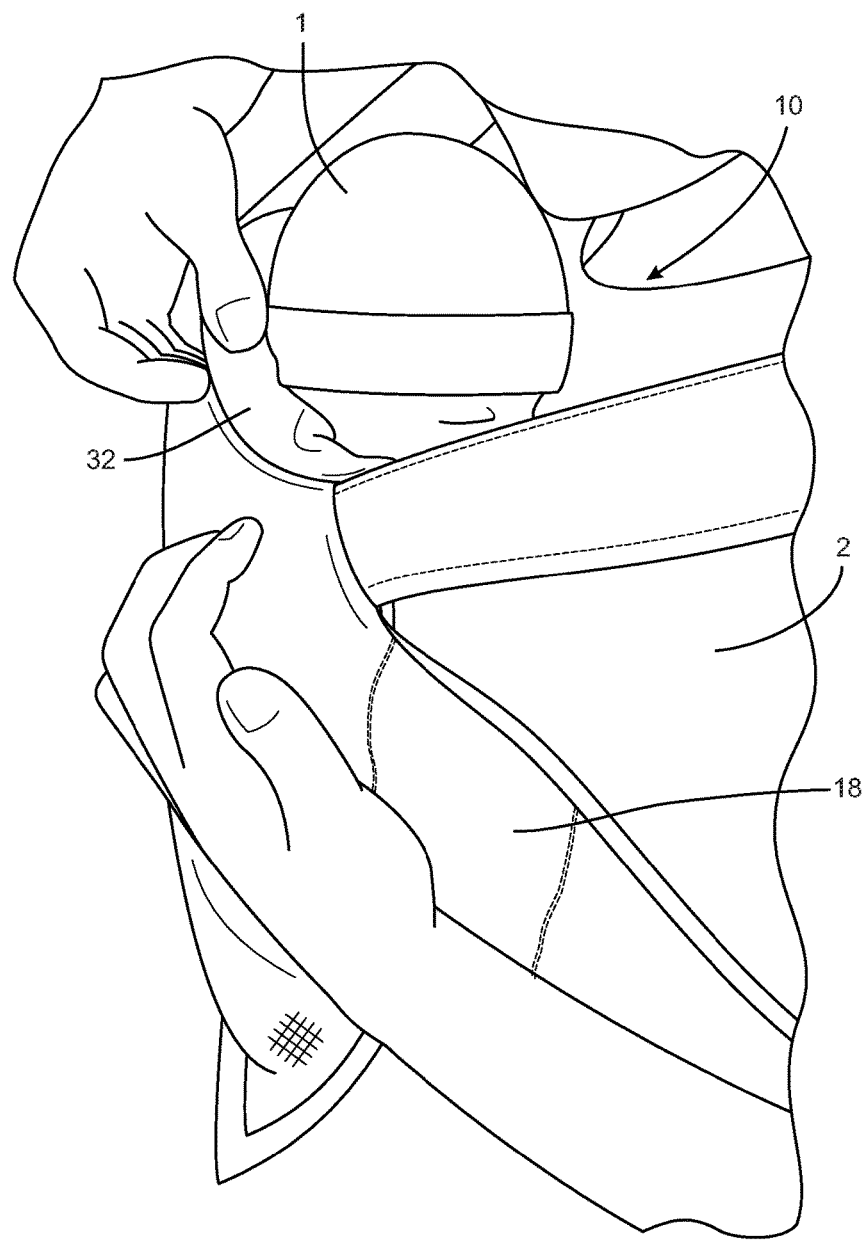
FIG. 7 is a view of an infant thermoregulation and monitoring support device worn by a user with a neck support engaged.

With reference to FIG. 7, support panel 18 allows infant 1 to be secured to the chest of user 2 in the appropriate position. The appropriate position of infant 1 may include the legs of infant 1 in a frog-like position, the head of infant 1 turned to the side and the head and neck of infant 1 supported by neck support 32. In addition, neck support 32 may be engaged when infant thermoregulation and monitoring support device 10 is worn by user 2. In various embodiments, neck support 32 may be engaged by folding neck support 32 down or over to allow more support for the infant's neck.

Figure 8:
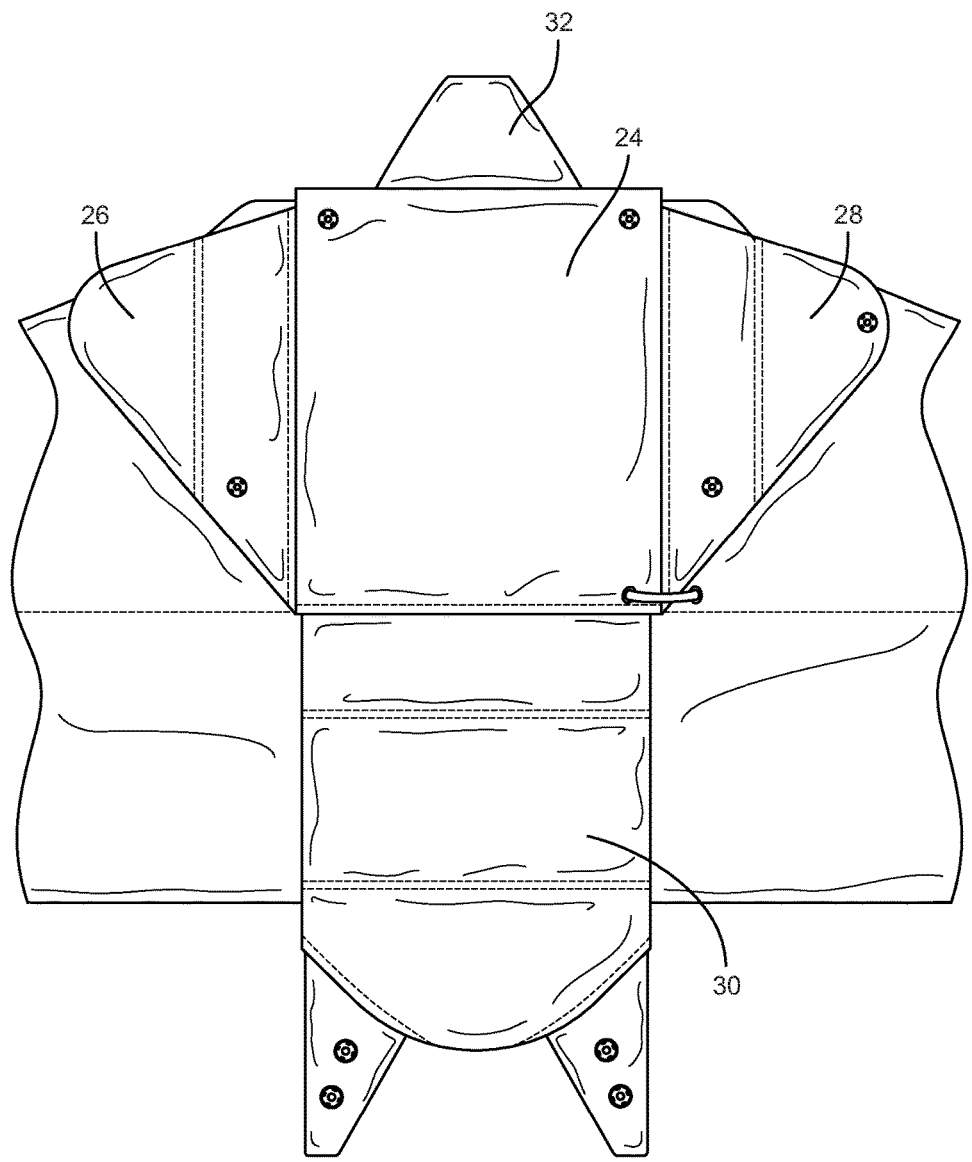
FIG. 8 a view of an enfolding mechanism in an open position.

With reference now to FIGS. 1 and 8, enfolding mechanism 14 generally includes a back panel 24, a left fold 26, a right fold 28, a middle fold 30, and a neck support 32. Enfolding mechanism 14 may be made in many different sizes. For instance, in various embodiments, enfolding device 14 may be suitable for babies that are less than 1500 grams, while in other embodiments enfolding device 14 may be suitable for babies that are greater than 1500 grams. Additionally, in one exemplary embodiment, enfolding device 14 may be configured to be self-warming.

Further, in various embodiments, enfolding device 14 may be formed of a flexible material that can house lightweight heating elements. The material may be waterproof, breathable and/or windproof. Further, in various embodiments, the heating elements may be woven into the flexible material. In one exemplary embodiment, enfolding device 14 may also be formed by sandwiching an insulated material, such as Insul-Brite, between at least two layers of a conductive, woven material, such as rip stop, or more specifically, Super Waterproof Breathable Tex 3-ply Ripstop.

Figure 9:
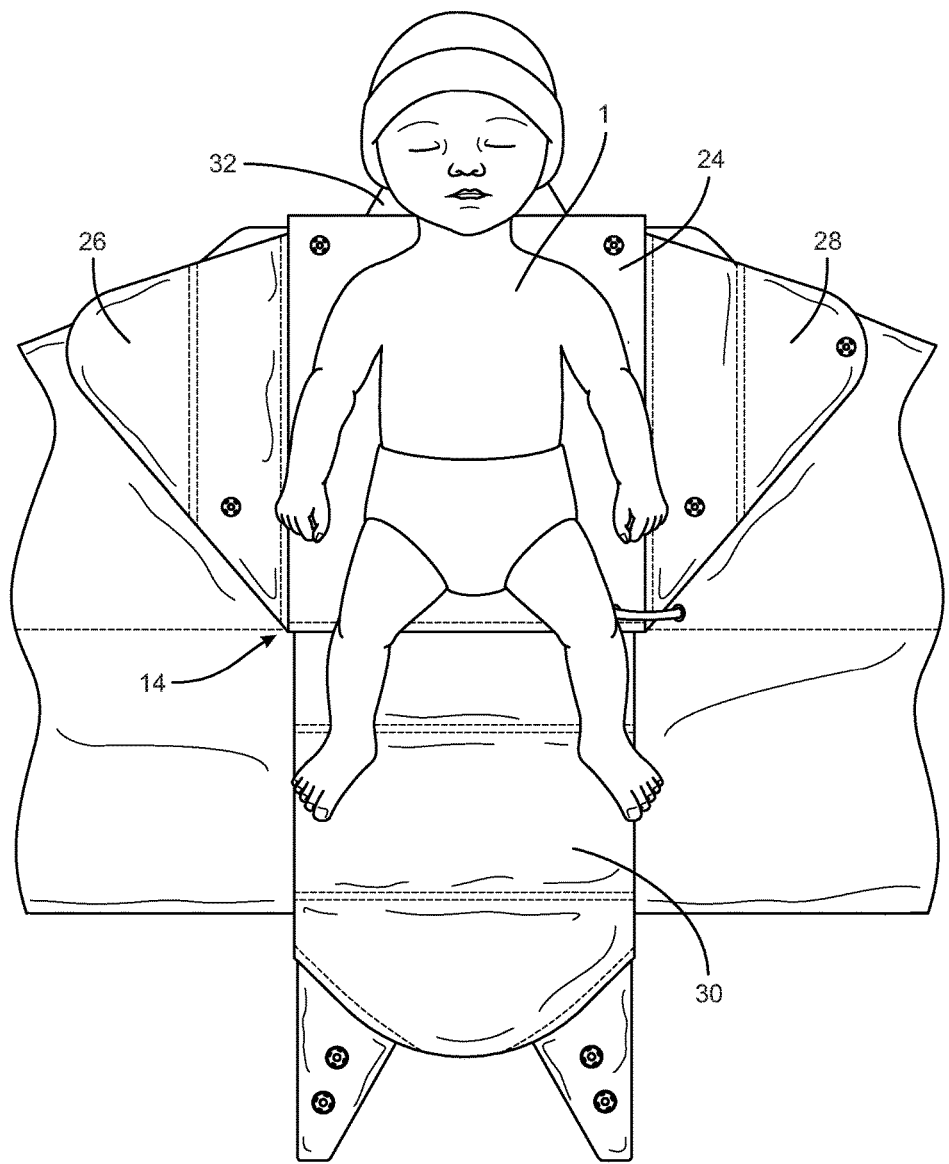
FIG. 9 is a view of an infant positioned on an enfolding mechanism in an open position.
Figure 12:
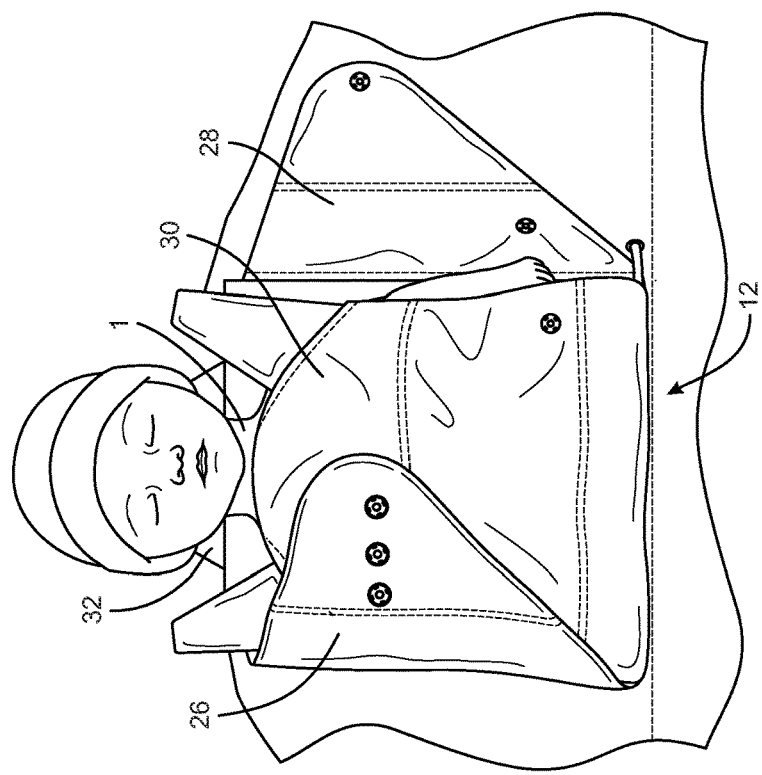
FIG. 12 is a view of an infant in an enfolding mechanism in a closed position with a middle fold, a left fold and a right fold all in closed positions.

Referring now to FIGS. 8-12, enfolding mechanism 14 may be in an open position (FIGS. 1, 8 and 9) or a closed position (FIG. 12). In various embodiments, enfolding mechanism 14 may be in an open position when infant thermoregulation and monitoring support device 10 is being worn by a user or in a closed position when device 10 is not being worn by a user. This allows the infant to be in contact with the user when the device is being worn, but wrapped in enfolding mechanism 14 when the user is unavailable. With reference to FIG. 9, an infant 1 is properly positioned on back panel 24 of enfolding mechanism 14 in an open position with the infant's head resting upon neck support 32. Referring to FIGS. 9-12, enfolding mechanism 14 may be transitioned from an open position (FIG. 9) to a closed position (FIG. 12). Middle fold 30, left fold 26, and right fold 28 may be securely closed by use of at least one of a hook and loop closure, a zipper, a button, a snap and/or a similar mechanism.

Figure 10:
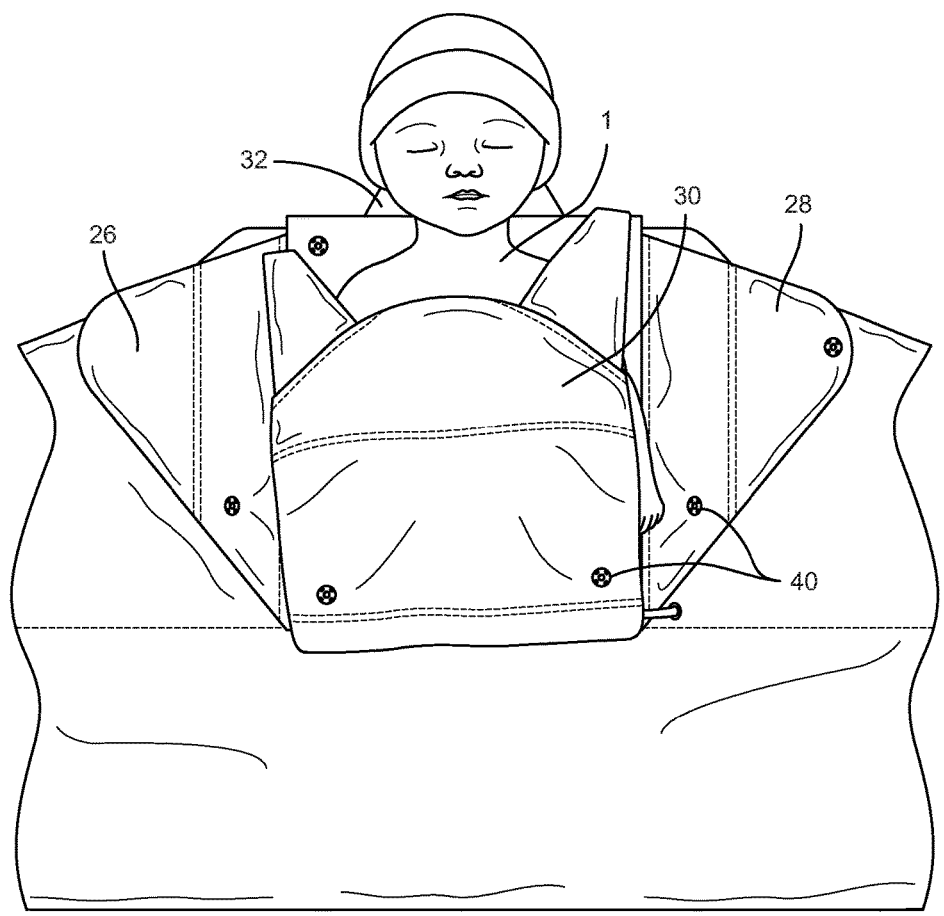
FIG. 10 is a view of an infant in an enfolding mechanism with a middle fold in a closed position.
Figure 11:
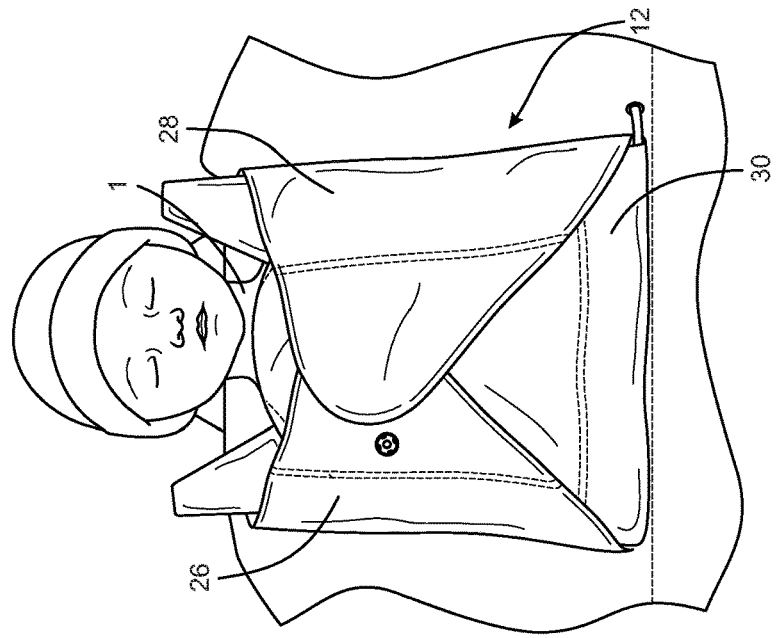
FIG. 11 is a view of an infant in an enfolding mechanism with a middle fold and a left fold in closed positions.

Referring to FIG. 10, generally, the first step in transitioning enfolding mechanism 14 to the closed position is for middle fold 30 to be in a closed position by folding the flap up and over the infant's legs and chest while left fold 26 and right fold 28 are in the open position or still unfolded. Subsequently, with reference to FIG. 11, middle fold 30 remains closed while right fold 28 may be transitioned into a closed position by folding the flap over onto middle fold 30. Left fold 26 may remain in an open position. This may also be done such that left fold 26 and middle fold 30 may be in a closed position while right fold 28 may be in an open position.

Then, referring to FIG. 12, enfolding mechanism 14 is in the closed position when middle fold 30, right fold 28, and left fold 26 are all in the closed position. Left fold 26 may be transitioned into a closed position by folding the flap over onto middle fold 30 and right fold 28. In various embodiments, folds 26, 28 and 30 may be closed by engaging snaps, buttons, hook and loop closures or similar closure mechanisms. In an exemplary embodiment, the closure is a snap 40. Additionally, referring to FIGS. 13-16, enfolding mechanism 14 may allow for access to the limbs of an infant 1 while the rest of infant 1 is still within enfolding mechanism 14. Thus, referring to FIG. 13, a right arm 44 of infant 1 may be accessible by allowing right fold 28 to be partially open by opening at least one closure mechanism. Further, with reference to FIG. 14, a left arm 46 of infant 1 may be accessible by left fold 26 being partially open. Additionally, FIGS. 15 and 16 show legs 48, 50 of infant 1 being accessible by left fold 26 being partially open (FIG. 15) or right fold 28 being partially open (FIG. 16).

Figure 17:
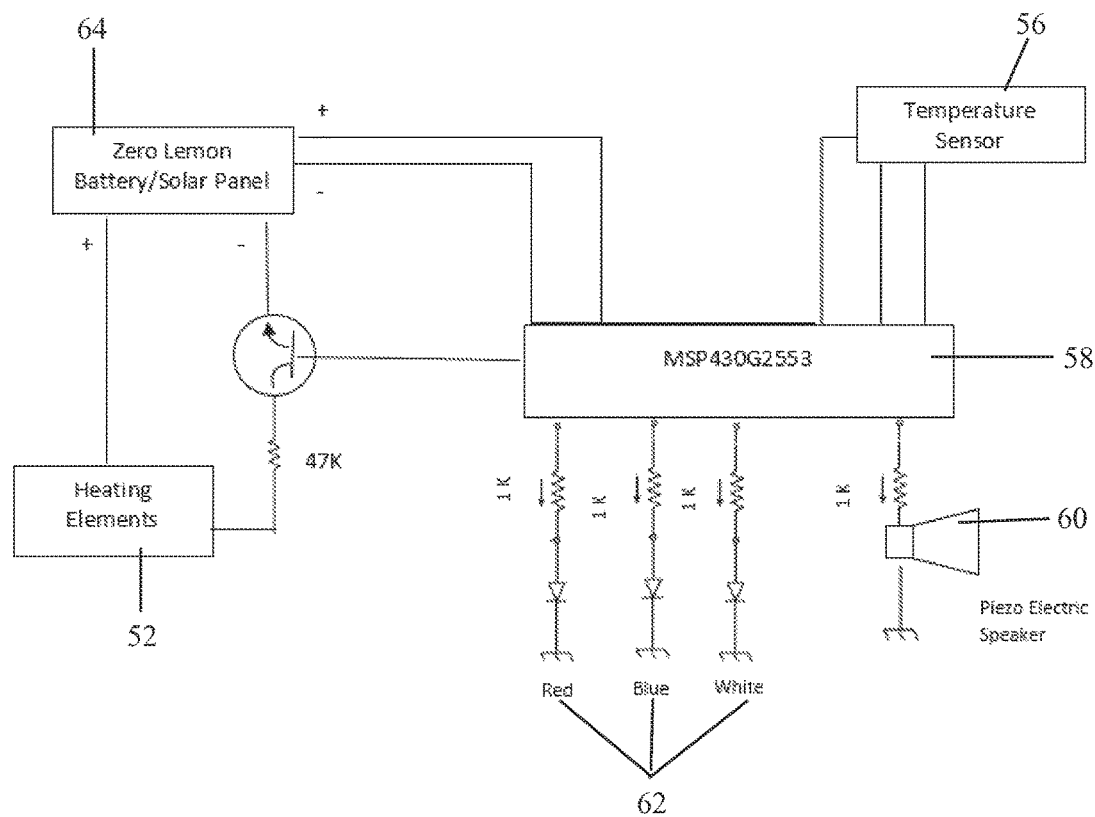
FIG. 17 is a view of a circuit design for a temperature stabilizing device.

Referring now to FIG. 17, a temperature stabilizing device may include a circuit that includes at least one of a heat source 52, a temperature sensor 56, a microcontroller 58, at least one audible signal 60, at least one visual signal 62, and/or a power source 64. In various embodiments, temperature stabilizing device 36 may further include electrical housing that encompasses at least one of heat source 52, temperature sensor 56, microcontroller 58, audible signal 60, visual signal 62, and/or power source 64. Additionally, the electrical housing may be created through the use of a 3D printer. In various embodiments, the electrical housing may be of a rectangular prism geometry. Further, the electrical housing may include a lid and a main box. Additionally, in various embodiments, a rubber gasket may be sandwiched between a lid and a main box of the electrical housing to provide necessary waterproofing. Also, stainless steel nuts and bolts may be used to clamp the lid in place.

In alternative embodiments, a temperature stabilizing device may further include one or a plurality of sensors. The sensor(s) may monitor the infant's body temperature, respiration rate, heart rate, apnea, oxygen saturation, blood sugar, bilirubin, and/or body weight (including daily changes in body weight).

In addition, temperature sensor 56 and/or any other provided sensor may be linked to a transmitter. The transmitter may transmit sensor data to an external display or device (i.e., smart phone) via a hardwire connection or a wireless connection. In an exemplary embodiment, the connection is via Bluetooth®. Further, the display or device may also contain an algorithm such that the display or device may produce an alert (visual or audible) when sensor data is out of designated ranges.

Figure 18:
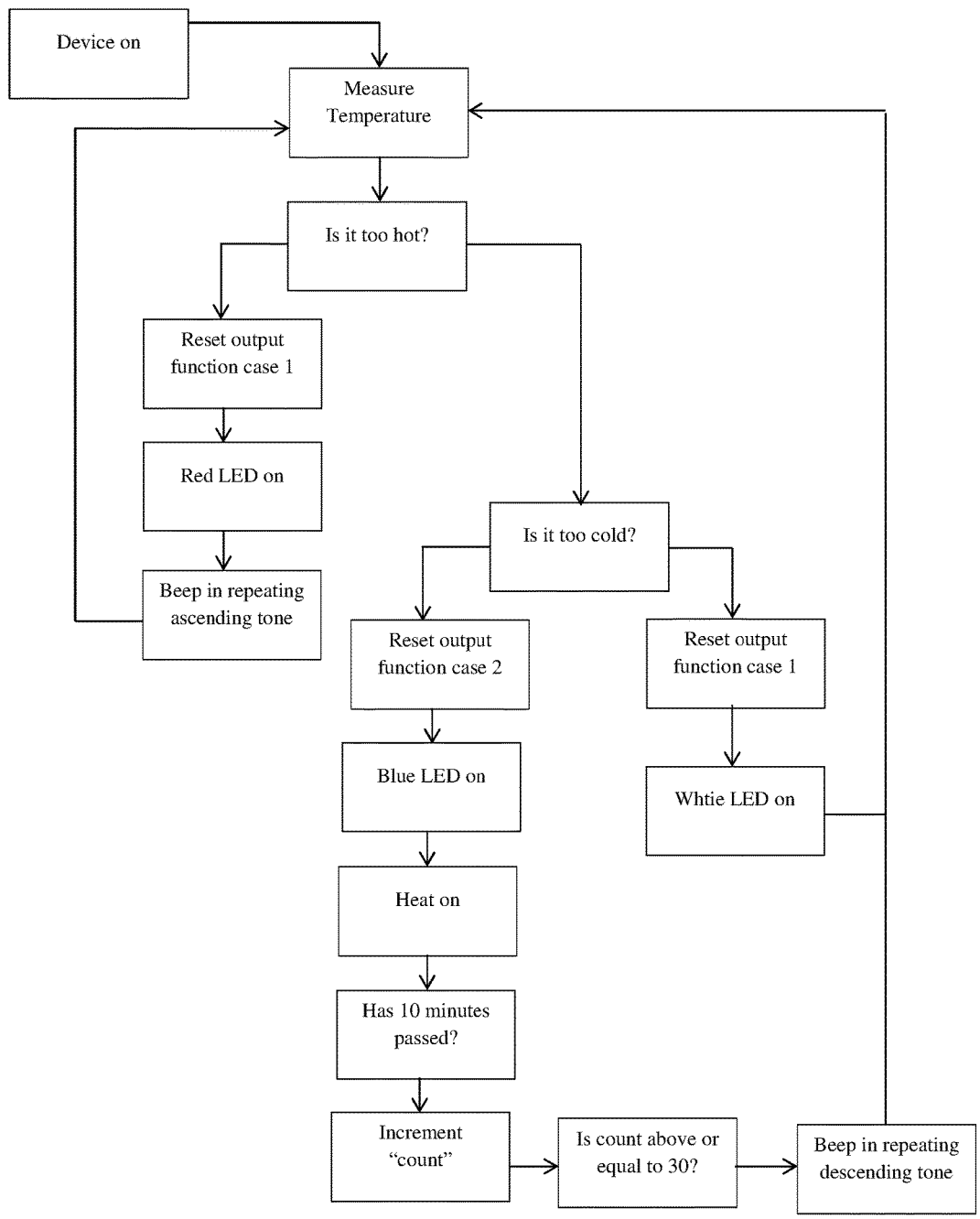
FIG. 18 is a flowchart for an algorithm for a microcontroller within a temperature stabilizing device.

Still referring to FIG. 17, in various embodiments, microcontroller 58 may be in circuit with temperature sensor 56, power source 64, heat source 52, visual signals 62 and audible signal 60 such that according to an algorithm (flow chart for algorithm—FIG. 18), microcontroller 58 may instruct power source 64 and heat source 52 to provide an even warmth to enfolding mechanism 14 when temperature sensor 56 indicates to microcontroller 58 that infant 1 is too cold. In an exemplary embodiment, audible signal 60 may be a piezo electric speaker, visual signals 62 may be an LED light and power source 64 may be a battery and/or solar panel. Alternatively, heat for warming the device may be produced by a chemical pack, a heat absorbing pack, heating elements, exposure to boiling or a microwave, or direct exposure to maternal or solar heat sources.

In various embodiments, audible signal 60 may be activated when the temperature of infant 1 as determined by temperature sensor 56 is above 37.7° C. or below 36.4° C. Additionally, in various embodiments, temperature stabilizing device 36 may include at least three visual signals 62. Further, each of the at least three visual signals may signal different temperature ranges. For instance, in various embodiments, one visual signal may be activated when the temperature of infant 1 is determined by the temperature sensor 56 to be less than 36.4° C., while another is activated when the temperature is determined to be at or between 36.4° C. and 37.7° C., while yet another is activated when the temperature is determined to be above 37.7° C. Additionally, in various embodiments, the at least three visual signals may be of different colors such as blue for temperatures below 36.4° C., white for temperatures between 36.4° C. and 37.7° C. and red for temperatures above 37.7° C.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

Furthermore, the scope is accordingly to be limited by nothing other than the appended claims, in which reference to an element in the singular is not intended to mean "on and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An infant thermoregulation and monitoring support device, comprising:
    an enfolding mechanism configured to enfold a torso and limbs of an infant, the enfolding mechanism including:
        a back panel configured to cover a back of the torso of the infant, the back panel having a top portion configured to be arranged near the infant's head and a bottom portion configured to be arranged near the infant's bottom;
        a middle fold fixedly coupled to the bottom portion of the back panel along a fold line, the middle fold configured to fold along the fold line such that a first side of the middle fold faces toward and at least partially covers a first side of the back panel;
        a first lateral fold fixedly coupled to the back panel between the top portion and the bottom portion, the first lateral fold configured to fold over a first lateral fold line such that a first side of the first lateral fold faces toward and at least partially covers the first side of the back panel, the first lateral fold further configured to be removably fastened to a second side of the middle fold, the second side of the middle fold facing in the opposite direction as the first side of the middle fold; and
        a second lateral fold fixedly coupled to the back panel between the top portion and the bottom portion, the second lateral fold configured to fold over a second lateral fold line such that a first side of the second lateral fold faces toward and at least partially covers the first side of the back panel, the second lateral fold further configured to be removably fastened to the second side of the middle fold, the second lateral fold further configured to be removably fastened to a second side of the first lateral fold, the second side of the first lateral fold facing in the opposite direction as the first side of the first lateral fold;
    a carrying mechanism fixedly coupled to the enfolding mechanism and configured to support the infant in the enfolding mechanism against a torso of a wearer, the carrying mechanism including:
        a waistband configured to encircle the torso of the wearer; and
        a support panel coupled directly to the waistband along an edge of the waistband; and
    a temperature stabilizing device coupled to the enfolding mechanism, the temperature stabilizing device configured to provide heat to the enfolding mechanism, wherein:
    a second side of the back panel, which faces in a direction opposite the first side of the back panel, is fixedly coupled to the support panel of the carrying mechanism such that the fold line is arranged along the edge of the waistband and such that the back panel is arranged between the middle fold and the support panel when the middle fold is folded along the fold line and covers the first side of the back panel.

2. The infant thermoregulation and monitoring support device of claim 1, wherein:
    the enfolding mechanism further comprises a neck support portion, and
    each of the first lateral fold, the second lateral fold, and the neck support portion is directly coupled to the back panel.

3. The infant thermoregulation and monitoring support device of claim 1, wherein:
    the enfolding mechanism is self-warming.

4. The infant thermoregulation and monitoring support device of claim 1, wherein:
    the carrying mechanism further comprises at least one strap coupled directly to the waistband.

5. The infant thermoregulation and monitoring support device of claim 1, wherein:
    the carrying mechanism further comprises a pocket arranged on the support panel, and
    the temperature stabilizing device is configured to be received within the pocket.

6. The infant thermoregulation and monitoring support device of claim 1, wherein:
    the temperature stabilizing device comprises at least one of a heat source, a temperature sensor, a microcontroller, at least one alarm, at least one light, and a power source.

7. The infant thermoregulation and monitoring support device of claim 6, wherein:
    the temperature stabilizing device further comprises an electrical housing.

8. The infant thermoregulation and monitoring support device of claim 1, wherein:
    the carrying mechanism comprises at least one perforation configured such that the temperature stabilizing device is connected to the enfolding mechanism through the at least one perforation.

9. A device for supporting and regulating a body temperature of an infant, the device comprising:
    a carrying mechanism including a support panel and a waistband, the carrying mechanism configurable in a first configuration, in which the carrying mechanism is secured to a caregiver, and in a second configuration, in which the carrying mechanism is not secured to the caregiver;

an enfolding mechanism coupled to the carrying mechanism and configured to directly contact and support the infant, the enfolding mechanism including a back panel and a middle fold, the middle fold fixedly coupled to the back panel and positionable in a first position, in which the middle fold is arranged such that a first side of the middle fold faces toward and at least partially covers a first side of the back panel, and in a second position, in which the middle fold is arranged so as to not cover the back panel, the back panel coupled to the support panel such that the back panel is arranged between the support panel and the caregiver when the carrying mechanism is in the first configuration and the middle fold is arranged between the back panel and the caregiver when the middle fold is in the first position; and a temperature stabilizing device coupled to the enfolding mechanism and configured to at least one of:
selectively detect a temperature of the enfolding mechanism, and
selectively modify the temperature of the enfolding mechanism, wherein:
the enfolding mechanism further includes a first lateral fold fixedly coupled to the back panel, the first lateral fold configured to fold over a first lateral fold line such that a first side of the first lateral fold faces toward and at least partially covers the first side of the back panel, the first lateral fold further configured to be removably fastened to a second side of the middle fold, the second side of the middle fold facing in the opposite direction as the first side of the middle fold, and
the enfolding mechanism further includes a second lateral fold fixedly coupled to the back panel, the second lateral fold configured to fold over a second lateral fold line such that a first side of the second lateral fold faces toward and at least partially covers the first side of the back panel, the second lateral fold further configured to be removably fastened to the second side of the middle fold, the second lateral fold further configured to be removably fastened to a second side of the first lateral fold, the second side of the first lateral fold facing in the opposite direction as the first side of the first lateral fold.

10. The device of claim 9, wherein:
each of the first and second lateral folds is individually positionable in a first position, in which the lateral fold faces toward and at least partially covers the back panel, and in a second position, in which the lateral fold does not face toward and at least partially cover the back panel.

11. The device of claim 10, wherein:
each of the first and second lateral folds includes at least one fastening device configured to selectively retain the lateral fold in the first position.

12. The device of claim 9, wherein:
the temperature stabilizing device is configured to provide a discernable signal when the temperature of the enfolding mechanism is below a predetermined minimum temperature.

13. The device of claim 9, wherein:
the temperature stabilizing device is configured to provide a discernable signal when the temperature of the enfolding mechanism is above a predetermined maximum temperature.

14. The device of claim 9, wherein:
the temperature stabilizing device is configured to provide heat to the enfolding mechanism when the temperature of the enfolding mechanism is below a predetermined minimum temperature.

15. The device of claim 10, wherein:
each of the middle fold and the first and second lateral folds is positionable in the first position and the second position when the carrying mechanism is in the second configuration.

16. The device of claim 10, wherein:
each of the middle fold and the first and second lateral folds is positionable in the first position and the second position when the carrying mechanism is in the first configuration.

17. The device of claim 9, wherein:
at least a portion of the temperature stabilizing device is received within the enfolding mechanism.

18. The device of claim 9, wherein:
the enfolding mechanism further includes a neck support configured to support a neck of the infant when the middle flap is positioned in the first position and in the second position.

* * * * *